United States Patent [19]

Ohnishi et al.

[11] 4,404,570

[45] Sep. 13, 1983

[54] LASER RECORDER

[75] Inventors: Masahiro Ohnishi; Yuji Ohara; Hiroshi Oono; Shigenori Oosaka, all of Asaka, Japan

[73] Assignee: Fuji Photo Film Co., Ltd., Kanagawa, Japan

[21] Appl. No.: 231,064

[22] Filed: Feb. 3, 1981

[30] Foreign Application Priority Data

Feb. 8, 1980 [JP] Japan .................................. 55/14626

[51] Int. Cl.³ ........................................... G01D 15/14
[52] U.S. Cl. .................................... 346/108; 358/298
[58] Field of Search ............................ 346/76 L, 108; 358/296–299, 300, 302; 369/124

[56] References Cited

U.S. PATENT DOCUMENTS 3,725,574  4/1973  Gast ...................................... 358/298
4,001,492  1/1977  Suzuki et al. ................... 358/298 X

FOREIGN PATENT DOCUMENTS 55-102966  8/1980  Japan ................................... 358/298

OTHER PUBLICATIONS

IBM Technical Disclosure Bulletin, vol. 18, No. 3, "Adaptive Contrast Ranging for Images", Wong, Aug. 1975, pp. 914–917.

Primary Examiner—G. Z. Rubinson
Assistant Examiner—W. J. Brady
Attorney, Agent, or Firm—Sughrue, Rothwell, Mion, Zinn, Macpeak & Seas

[57] ABSTRACT

A laser recorder device in which many levels of halftone densities are accurately produced with smooth transitions between areas of different densities. An input signal is sampled with a sampling pulse in response to which digital output values of a predetermined function of the input signal are produced. Pulses are applied to a semiconductor laser beam source with the number and frequency of the pulses during a preset application time being determined in accordance with the magnitude of the input signal.

9 Claims, 8 Drawing Figures

LASER RECORDER

BACKGROUND OF THE INVENTION

The present invention relates to a recorder having a semiconductor laser which can reproduce with densities of more than several tens of levels a picture such as a photograph having halftones.

A picture having halftones can be recorded by various techniques by which a laser beam is intensity-modulated. (1) In one of these techniques, an ultrasonic optical modulator is employed; (2) in another technique, the discharge current of a gas laser is changed; and (3) in a third technique, the current of a semiconductor laser is varied.

The first technique requires an expensive ultrasonic optical modulator and a fine adjustment device for setting the modulator to the Bragg angle. Thus, the first technique is disadvantageous in that the device has a high manufacturing cost and intricate construction. The gas laser discharge current modulation of the second technique suffers from drawbacks in that its modulation frequency range is very low, only several hundreds of Hertz, and the service life of the laser tube is reduced because the discharge current is varied. The third technique in which the current of the semiconductor laser is varied is also disadvantageous in that, since the semiconductor laser has an optical output current characteristic as indicated in FIG. 1, the optical output is greatly changed by changing the current only slightly, and accordingly it is considerably difficult to modulate the optical output by more than several tens of levels by changing the current.

Accordingly, an object of the invention is to provide a laser recorder which can record a picture having halftones with densities of more than several tens of levels. Another object of the invention is to provide a laser recorder which has several tens or several hundreds of optical modulation levels. A further object of the invention is to provide a laser recorder which can record a picture rich in halftones.

SUMMARY OF THE INVENTION

Provided according to the invention is a laser recorder using a semiconductor laser which utilizes the high frequency modulation characteristic of a semiconudctor laser to provide more than several hundreds of modulation levels.

In accordance with the invention, there is provided a laser recorder device in which an input signal is sampled with a sampling pulse signal and a high frequency pulse signal having a frequency higher by at least two orders of magnitude than that of the sampling pulse signal is produced and is applied to a semiconductor laser with the number pulses applied to the semiconductor laser in a preset period being controlled according to the input signal.

The term "sampling pulse" as used herein is a pulse signal for sampling an input video signal at predetermined time intervals. The frequency of the sampling pulse can be selected as desired. However, it is preferable, in order to reproduce a picture with a high resolution, that the frequency be slightly higher than the highest frequency of the video signal. The term "high frequency pulse" is a pulse whose frequency is higher than that of the sampling pulse, preferably several hundreds to several ten thousands times higher. Both pulses may be generated separately although it is preferable to generate the sampling pulse by frequency-dividing the high frequency pulse as described later with reference to a preferred embodiment of the invention.

The laser recorder according to the invention operates in accordance with a predetermined function derived by taking into consideration a logarithmic conversion relation and a recording material characteristic or an input/output characteristic which has been stored in advance. The term "input signal" as used herein is a video signal although it may also be an analog signal or a digital signal.

The relation between the number of pulses applied and the density of a recorded image in the case where the semiconductor laser beam is modulated by pulses of a high frequency pulse signal will be described with reference to FIG. 2. FIG. 2 is a graphical representation indicating the above-described relation in the case where the value of $\gamma$ (the gradient of the characteristic curve) of a recording material is 1 and the highest density is 2.0. When the intensity modulation is carried out with about 100 pulses, the density difference D changes by about 0.2 for each pulse while the density difference D changes only by about 0.1 for each pulse in the vicinity of about 20 pulses in the high density range. That is, in the case of FIG. 2, the gradations of low density are reproduced very coarsely. In order to reproduce more density levels, the sampling must be so performed that intensity modulation is carried out with the maximum number of pulses being 1000 or more.

As is clear from the above description, in order to reproduce gradations at equal density intervals of about ten levels, it is necessary to perform the intensity modulation with at least 10 pulses, while in order to reproduce the gradations of more levels, it is necessary to perform the intensity modulation with at least 1000 pulses. If an intensity modulation operation is carried out with 10 pulses, the gradations are reproduced only with two or three levels at equal density intervals $\Delta D$.

In view of the foregoing, in accordance with the invention, the high frequency modulation characteristic of a semiconductor laser is utilized to carry out pulse modulation with a high frequency signal, and a semiconductor laser is intensity-modulated with a high frequency signal higher in frequency by two or three orders of magnitude than the highest input video frequency to thereby accurately reproduce halftones on the recording sheet.

In the recorder device disclosed in U.S. patent application Ser. No. 214,815 filed Dec. 9, 1980 by the present applicant, a video signal is sampled and the number of pulses of a high frequency pulse signal applied to a beam source is controlled according to the signal. Counting of the high frequency pulse signal is started with a sampling pulse and is ended when the number of pulses counted reaches a predetermined value. No light is applied to the recording sheet until a succeeding sampling pulse is applied. That is, the recording sheet has a portion which is not exposed. Thus, the recorded image is not smooth and sometimes includes "moiré" patterns.

On the other hand, the laser recorder of the present invention includes a source for generating at least two high frequency pulse signals. The high frequency signals are selectively employed, according to the numbers of applied pulses thereof, to prevent an exposure from being effected collectively at a start point of the sampling pulses thereby to record an image with smooth gradations.

DESCRIPTION OF THE PREFERRED EMBODIMENTS

The invention will be described with reference to preferred embodiments thereof.

Figure 3:
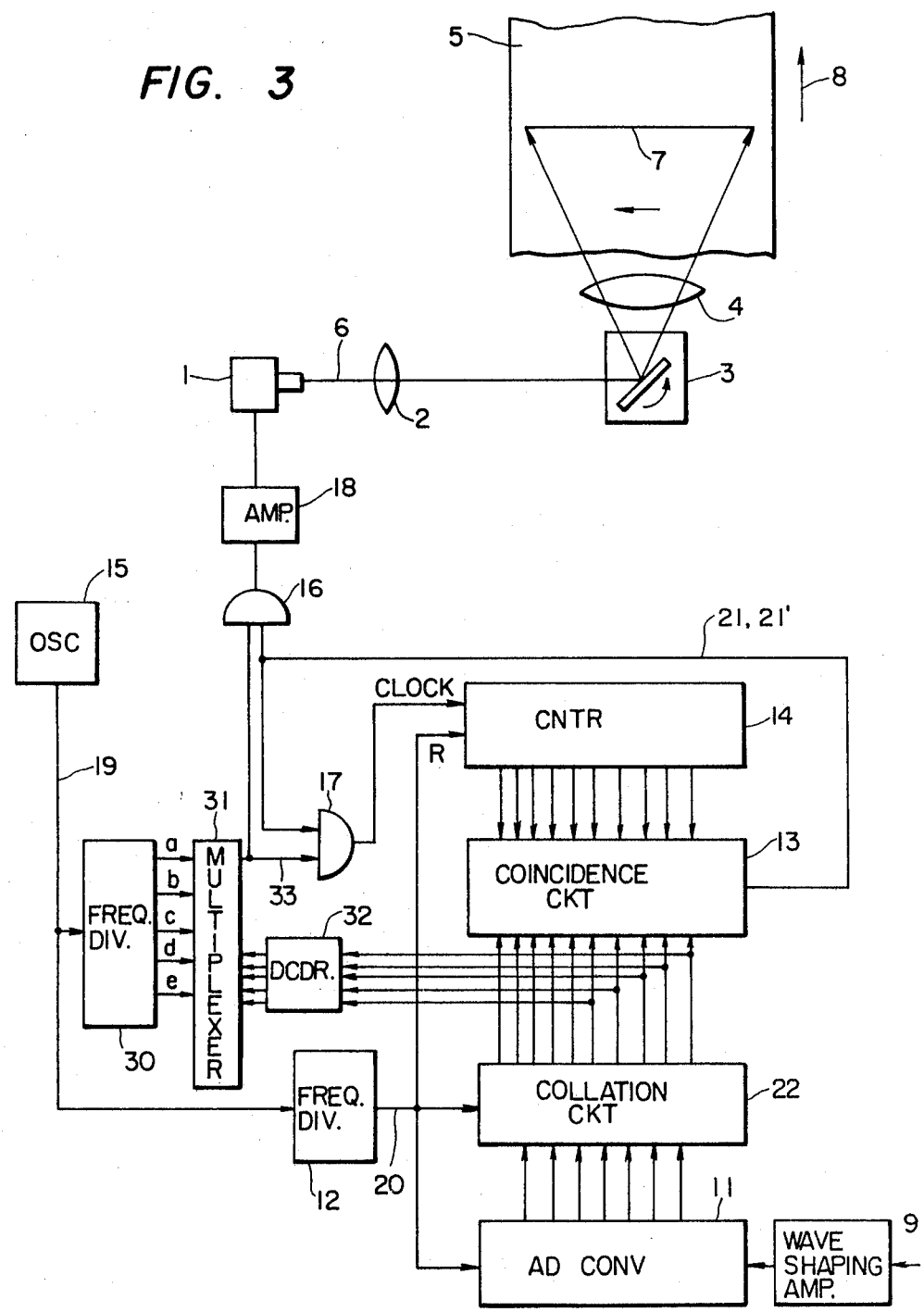
FIG. 3 is a block diagram showing a preferred embodiment of a laser recorder according to the invention.

FIG. 3 is a block diagram showing a preferred embodiment of a laser recorder constructed according to the invention. The laser recorder, as shown in FIG. 3, includes a semiconductor laser 1, a beam shaping lens 2, a deflector 3, a focusing lens 4, and a recording sheet 5. It is desirable that the recording sheet be a silver salt photographic sheet or a xerographic sheet which is capable of reproducing halftones and is sensitive to the red or infrared wavelength of the semiconductor laser beam. The semiconductor laser beam 6, which is produced in accordance with current pulse modulation, is collimated by the beam shaping lens 2, deflected by the deflector 3, and formed into a spot of a predetermined size by the focusing lens 4 to thus carry out a main scanning operation upon the recording sheet 5 to form a scanning line 7. The auxiliary scanning of the laser beam is carried out by moving the recording sheet 5 in the direction of the arrow 8. In this embodiment, the deflector 3 is a galvanometer.

The modulation of the semiconductor laser beam will next be described. A feature of a semiconductor laser is that it can be modulated with a pulse signal of a high frequency up to several hundreds of megahertz. By the use of high frequency pulse modulation, the quantity of light applied to the recording sheet can be controlled by setting the number of pulses applied to the semiconductor laser. For instance, if the highest video frequency is 1 KHz, a video signal sampled at a rate of 1 KHz is pulse-modulated with 1 MHz and the number of pulses applied to the semiconductor laser is accordingly controlled according to the variations in magnitude of the video signal with the number of pulses per application period ranging from zero to several thousands, halftone modulation can be achieved.

An example of the above-described pulse modulation technique will be described with reference to FIG. 3. The amplitude of an input video signal is amplified to a predetermined level by a waveform shaping amplifier 10. The video signal here is a received facsimile signal. A high frequency oscillator 15 outputs a high frequency pulse signal 19 which is subjected to frequency division by a frequency divider 12 as a result of which the divider 12 outputs a sampling pulse signal 20. It is preferable that the frequency of the sampling pulse signal 20 be slightly higher than the highest video frequency. An analog-to-digital (AD) converter 11, at the fall of the sampling pulse signal 20, samples the output signal of the amplifier 10 and converts it into a digital value. This digital value is held in the AD converter 20 until the next fall of the sampling pulse signal occurs. The signal thus subjected to analog-to-digital conversion is applied to a digital value collation circuit. Thus, a signal corresponding to a read density is applied from the facsimile transmitter to the digital value collation circuit 22.

Figure 2:
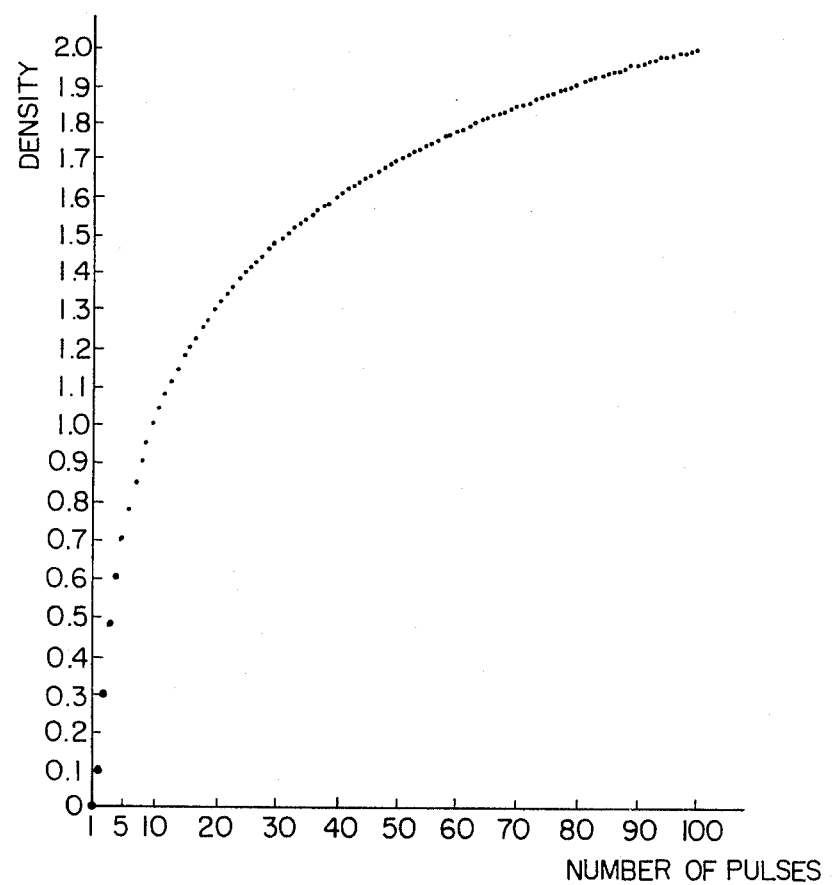
FIG. 2 is a graphical representation indicating pulse numbers controlling a semiconductor laser with respect to recorded image densities.

The digital signal thus applied is converted into a digital value representative of the number of pulses to be applied to the semiconductor laser in accordance with the curve indicated of FIG. 2 by the digital value collation circuit 22. The operation of the digital value collation circuit 22 is such that the circuit 22 outputs a digital value "1" for reproducing a density 0.1, a digital value "3" for reproducing a density 0.5, a digital value "10" for reproducing a density 1.0, a digital value "30" for reproducing a density 1.5, and a digital value "100" for reproducing a density 2.0. FIG. 2 shows the curve in the case where the $\gamma$ value of the recording material is 1. That is, different curves are provided for different values of $\gamma$. The collation value should be determined according to the recording material used. The digital value collation circuit 22 is preferably constituted by a read-only memory. The bits of the analog-to-digital conversion value of an input signal are applied as an address signal to the digital value collation circuit 22. As values corresponding to pulse numbers are stored as data at the various addresses of the read-only memory, pulse numbers corresponding to applied address signals are outputted by the digital value collation circuit 22 with the timing of the sampling pulse signal. In this embodiment, the signal from the facsimile transmitter is expressed as a signal corresponding to a density so that the values stored in the read-only memory need not subject the signal to logarithmic conversion. However, in the case of a signal which is not subjected to logarithmic conversion, the logarithmic conversion operation may be included in the digital value collation circuit.

Figures 4A, 4B, 4C, 4D, 4E:
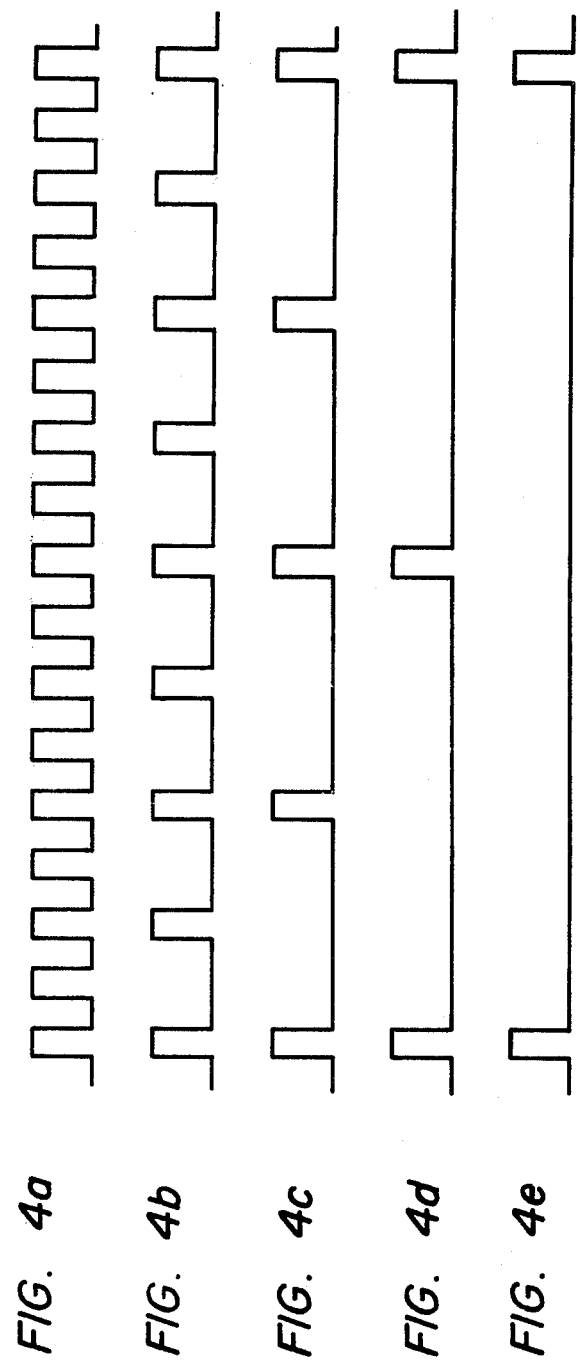
FIG. 4a-4e is a timing chart for a description of signals in the laser recorder according to the invention.

The frequency of the high frequency pulse signal 19 outputted by the high frequency oscillator 15 is about 100 to 1000 times as high as that of the sampling pulse signal 20. The high frequency pulse signal 19 is applied to the frequency division circuit 30 which produces five pulse signals a through e of different frequency as shown in FIG. 4. As is apparent from FIG. 4, the frequency of the pulse signal b is half that of the pulse signal a, the frequency of the pulse signal c is half that of the pulse signal b, the frequency of the pulse signal d is half that of the pulse signal c, and the frequency of the pulse signal e is half that of the pulse signal d. However, the pulse signals a through e all have the same pulse width T. One of the high frequency pulse signals a through e is selected by a multiplexer 31. The pulse signal thus selected is applied through an AND gate 17 to the clock input terminal of a counter 14 to increment the count of the counter 14. The counter 14 is reset by the output sampling pulse signal for the frequency divider 12. The output of the counter 14 is compared with the output of the digital value collation circuit 22 by a coincidence circuit 13. When the two coincide, the coincidence circuit 13 outputs a coincidence signal 21 of a logic "0" which is applied to the AND gate 17 to close the AND gate 17 to block the high frequency pulse signal 19. The coincidence signal 21 is further applied to an AND gate 16 to also close the AND gate 16. Before the AND gate 16 is closed, the high frequency pulse signal 19 from the high frequency oscillator 15 is applied through the AND gate 16 and the amplifier 18 to the semiconductor laser 1. The sampling pulse signal 20 is applied to the AD converter 11 and the counter 14 again and the AD converter 11 converts the input signal into a digital value which is further converted into a digital value representative of the read density by the digital value collation circuit. Also, the counter 14 is reset. If, in this operation, the input signal is not zero, the coincidence circuit 13 outputs a coincidence signal 21 of a logic "1" which is applied to the AND gates 16 and 17 to open the gates 16 and 17 as a result of which the high frequency pulse signal 19 is applied to the amplifier 18 and the counter 14. Thus, the high frequency pulse signal 19 is applied through the amplifier 18 to the semiconductor laser 1 until the coincidence circuit 13 outputs the coincidence signal 21 of a logic "0" indicative of coincidence.

The switching of the outputs a through e of the frequency division circuit 30 will be described. If the content of the counter 14 is stepped only by the highest frequency pulse signal a, the pulse counting is carried out with the start of the sampling pulse. In the case where the number of pulses is small, disadvantageously, the resultant image will then be unsmooth or a "moiré" effect is caused because the rear part of the recording sheet is partially not exposed. However, in accordance with the invention, five highest order bits of the output of the digital value collation circuit 22 are inputted to a decoder 32. In the embodiment described, the output of the circuit 22 is of ten bits or 1024 levels.

When the highest order bit is "1", the multiplexer 31 selects the pulse train a with the aid of the decoder 32. When the first and second highest bits are "0" and "1", respectively, the multiplexer 31 selects the pulse train b. When the first, second and third highest order bits are "0", "0" and "1", respectively, the pulse train c is selected. When the first, second, third and fourth highest order bits are "0", "0", "0" and "1", respectively, the pulse train d is selected. When the first, second, third, fourth and fifth highest order bits are "0", "0", "0", "0" and "1", respectively, the pulse train e is selected.

The multiplexer operates as described above to select the various pulse trains. When the pulse number outputted by the digital value collation circuit 22 is relatively small, a high frequency pulse signal such as d or e of relatively low frequency is outputted. When the pulse number is relatively large, a high frequency pulse signal such as a or b of relatively high frequency is outputted. With the circuit arrangement described above, the pulses are uniformly provided between the sampling operations, that is, the collective occurrence of pulses in the vicinity of a start point of the sampling pulse is prevented. Accordingly, the recorded image is smooth and no "moiré" effect is caused.

As the semiconductor laser beam is subjected to optical modulation with various high frequency pulse signals of different frequency, as described above, halftones can be reproduced considerably smoothly.

Figure 1:
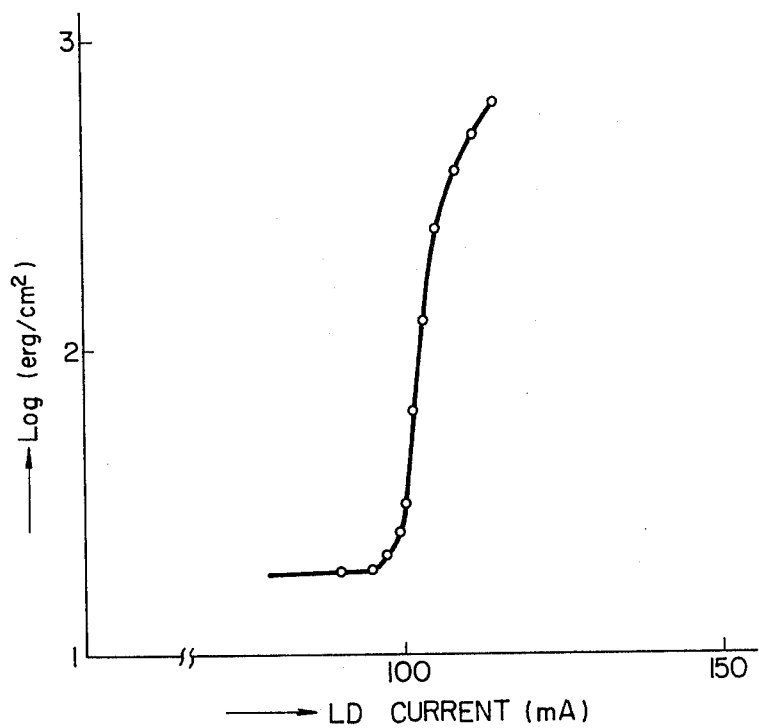
FIG. 1 is a graphical representation indicating the current-light emission characteristic of a semiconductor laser.

As is clear from the above-described embodiment of the invention, a semiconductor laser beam is modulated with a pulse signal whose frequency is higher by two to four orders of magnitude than the highest video frequency. Therefore, the laser recorder according to the invention provides more and stabler levels than a device in which intensity modulation is carried out by the use of an optical-output-current characteristic shown in FIG. 1.

The invention has been described with reference to a case where the semiconductor laser beam is modulated directly by a high frequency pulse signal. If a different laser such as a He-Ne laser is employed as the light source, the same effects as those of the present invention can be obtained utilizing an acousto-optic optical modulator.

According to the invention, halftones are satisfactorily recorded on the recording material and the gradations of an original picture are precisely reproduced. Furthermore, according to the invention, halftones are stably recorded.

What is claimed is:

1. A laser recorder device comprising: means for producing sampled digital values of an input signal; means for providing a digital output signal in response to a predetermined function of said sampled digital values of said input signal; a beam source; means for scanning an output beam of said beam source upon a recording medium; pulse generating means for producing an output pulse signal having a frequency substantially higher than the frequency at which said input signal is sampled; and means for applying pulses of said pulse signal to said beam generating means with the number of pulses applied being determined in accordance with the value of said digital output signal.

2. The laser recorder device of claim 1 wherein said pulse generating means comprises a frequency divider having an input coupled to said pulse generating means and having a plurality of outputs of different frequencies; multiplexer means having an input coupled to said outputs of said frequency divider; and decoder means having outputs coupled to control inputs of said multiplexer and inputs coupled to receive said output digital signal.

3. The laser recorder device of claim 1 or 2 wherein the number of said pulses applied to said beam generating means and the frequency of said pulses applied to said beam generating means are increasing functions of said input signal.

4. The laser recorder device of claim 3 wherein said increasing functions are derived from both a logarithmic conversion relation and a density-versus-sample pulse characteristic curve of a recording medium.

5. A laser recorder device comprising: beam generating means; means for scanning an output beam of said beam generating means upon a recording medium; means for producing a first pulse signal; means for frequency dividing said pulse signal to produce a second pulse signal having a frequency at least two orders of magnitude less than the frequency of said first pulse signal; a second frequency divider for producing a plurality of third pulse signals of different frequencies; a multiplexer having data inputs coupled to receive said outputs of said frequency divider; an analog-to-digital converter having an input coupled to receive an input signal; a read-only memory having address inputs coupled to outputs of said analog-to-digital converter, said read-only memory storing digital values representing a predetermined function of digital values of said input signal produced by said analog-to-digital converter; a coincidence circuit having a first set of inputs coupled to outputs of said read-only memory; a counter having count outputs coupled to second inputs of said coincidence circuit, said second pulse signal being coupled to a clock input of said analog-to-digital converter, a clock input of said read-only memory, and a reset input of said counter; a decoder having inputs coupled to said outputs of said read-only memory and outputs coupled to control inputs of said multiplexer; a first AND gate having a first input coupled to a data output of said multiplexer, a second input coupled to an output signal of said coincidence circuit and an output coupled to a clock input of said counter; a second AND gate having a first input coupled to said output of said multiplexer and a second input coupled to said output of said coincidence circuit; and an amplifier having an input coupled to an output of said second AND gate and an output coupled to operate said beam generating means in response to output pulses from said second AND gate.

6. The laser recorder device of claim 5 wherein said frequency divider has at least first through fifth outputs and wherein said inputs of said decoder are coupled to higher-order bits of said outputs of said read-only memory.

7. The laser recorder device of claim 5 or 6 wherein said predetermined function of said input signal is an increasing function and wherein the number of pulses applied to said beam generating means and the frequency of said pulses applied to said beam generating means during a predetermined period of time are an increasing function of said input signal.

8. The laser recorder device of claim 7 wherein said increasing functions are derived from both a logarithmic conversion relation and a density-versus-sample pulse characteristic curve of a recording medium.

9. A laser recorder device comprising:
beam generating means;
means for scanning an output beam of said beam generating means upon a recording medium; and
means for producing a pulsed signal for activating said beam generating means, the frequency and number of pulses of said signal applied to said beam generating means within a predetermined time period being determined in accordance with a magnitude characteristic of an input signal such that said frequency and number of pulses of said pulse signal applied to said beam generating means are increasing functions of said input signal, said increasing functions derived from both a logarithmic conversion relation and a density-versus-sample pulse characteristic curve of a recording medium.

* * * * *